United States Patent
Einfalt et al.

[15] 3,684,385
[45] Aug. 15, 1972

[54] METHOD AND APPARATUS FOR INSPECTING HOLLOW GLASS ARTICLES

[72] Inventors: Arthur C. Einfalt; Richard A. Osborn, both of Toledo, Ohio

[73] Assignee: Owens-Illinois, Inc.

[22] Filed: Aug. 10, 1970

[21] Appl. No.: 62,418

[52] U.S. Cl. .............................. 356/240, 250/223 B
[51] Int. Cl. ............................................. G01n 21/32
[58] Field of Search .................... 356/240; 250/223 B

[56] References Cited

UNITED STATES PATENTS 3,348,049   10/1967   Stacey ................ 250/223 B X
3,379,829   4/1968   Gambrell et al. .......... 356/240

FOREIGN PATENTS OR APPLICATIONS 1,425,188   12/1965   France

*Primary Examiner*—Ronald L. Wibert
*Assistant Examiner*—Orville B. Chew, II
*Attorney*—J. R. Nelson and E. J. Holler

[57] ABSTRACT

The method and apparatus for inspecting glass containers for defects wherein the containers are moved successively and continuously past a plurality of inspection stations and laser beams are directed toward the containers and moved to scan the containers. A diminution in the intensity of the beam transmitted through the containers causes a reject signal to be created.

27 Claims, 15 Drawing Figures

INVENTORS
ARTHUR C. EINFALT
RICHARD A. OSBORN
BY
J. R. Nelson and
E. J. Haller
ATTORNEYS

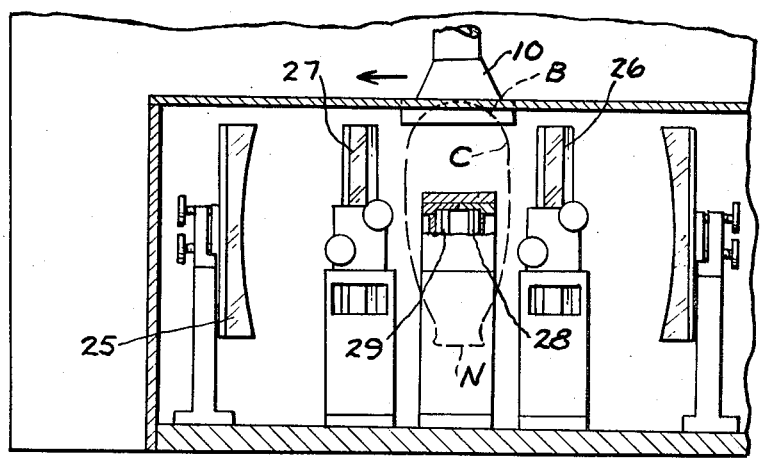
FIG. 2
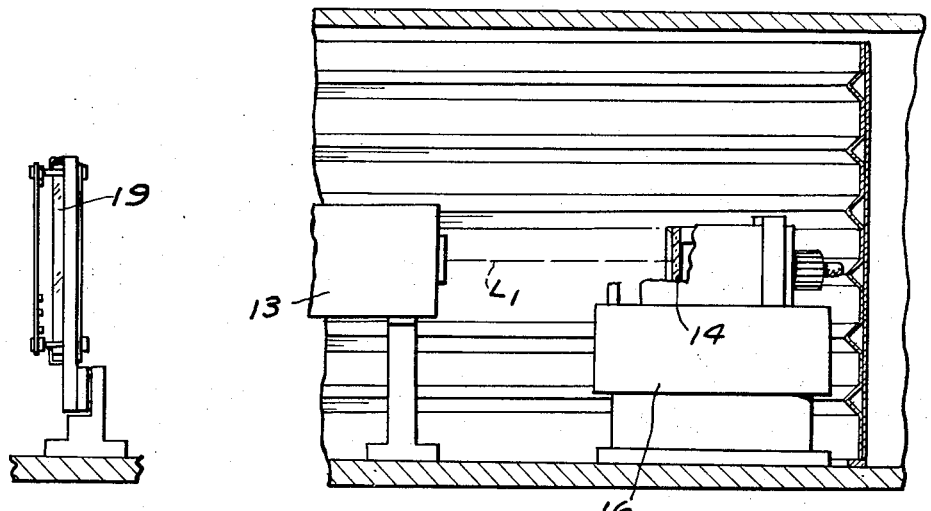
FIG. 4
FIG. 3
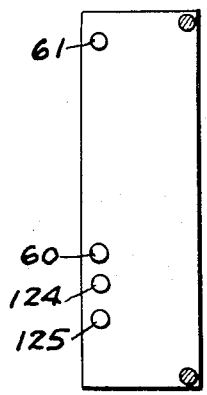
FIG. 5
INVENTORS
ARTHUR C. EINFALT
RICHARD A. OSBORN
BY
J. R. Nelson and
E. J. Holler
ATTORNEYS

METHOD AND APPARATUS FOR INSPECTING HOLLOW GLASS ARTICLES

This invention relates to inspecting containers for defects and particularly inspecting glass containers for defects.

BACKGROUND OF THE INVENTION

In glass containers and the like, it has heretofore been common to utilize light beams for inspecting for defects by rotating the container about its axis and directing the light beam against the container while the container is being rotated. The light beam is reflected and redirected by any defect and creates a reject signal. Such inspection systems have proved to be satisfactory but require the container to be interrupted in its movement along a path.

Among the objects of the present invention are to provide a container inspection method and apparatus wherein the container can be inspected at high speeds without interrupting its movement; which method and apparatus accurately detects defects without diminution in the speed of the container as it moves from one processing point to another; which apparatus is compact and not subject to extraneous influences.

SUMMARY OF THE INVENTION

In accordance with the invention, the containers are moved successively and continuously through a plurality of inspection stations and laser beams are directed toward the containers at the inspection stations. The laser beams are moved in a plane such that successive positions of the beam are parallel to one another to thereby scan successive portions of the container. A defect in the container will diminish the intensity of the beam transmitted through the container and this is sensed to create a reject signal.

DESCRIPTION OF THE DRAWINGS

FIG. 2 is a fragmentary sectional view taken along the line 2—2 in FIG. 1.

FIG. 3 is a fragmentary sectional view taken along the line 3—3 in FIG. 1.

FIG. 4 is a fragmentary sectional view taken along the line 4—4 in FIG. 1.

FIG. 5 is a sectional view taken along the line 5—5 in FIG. 1.

GENERAL DESCRIPTION

Figure 1:
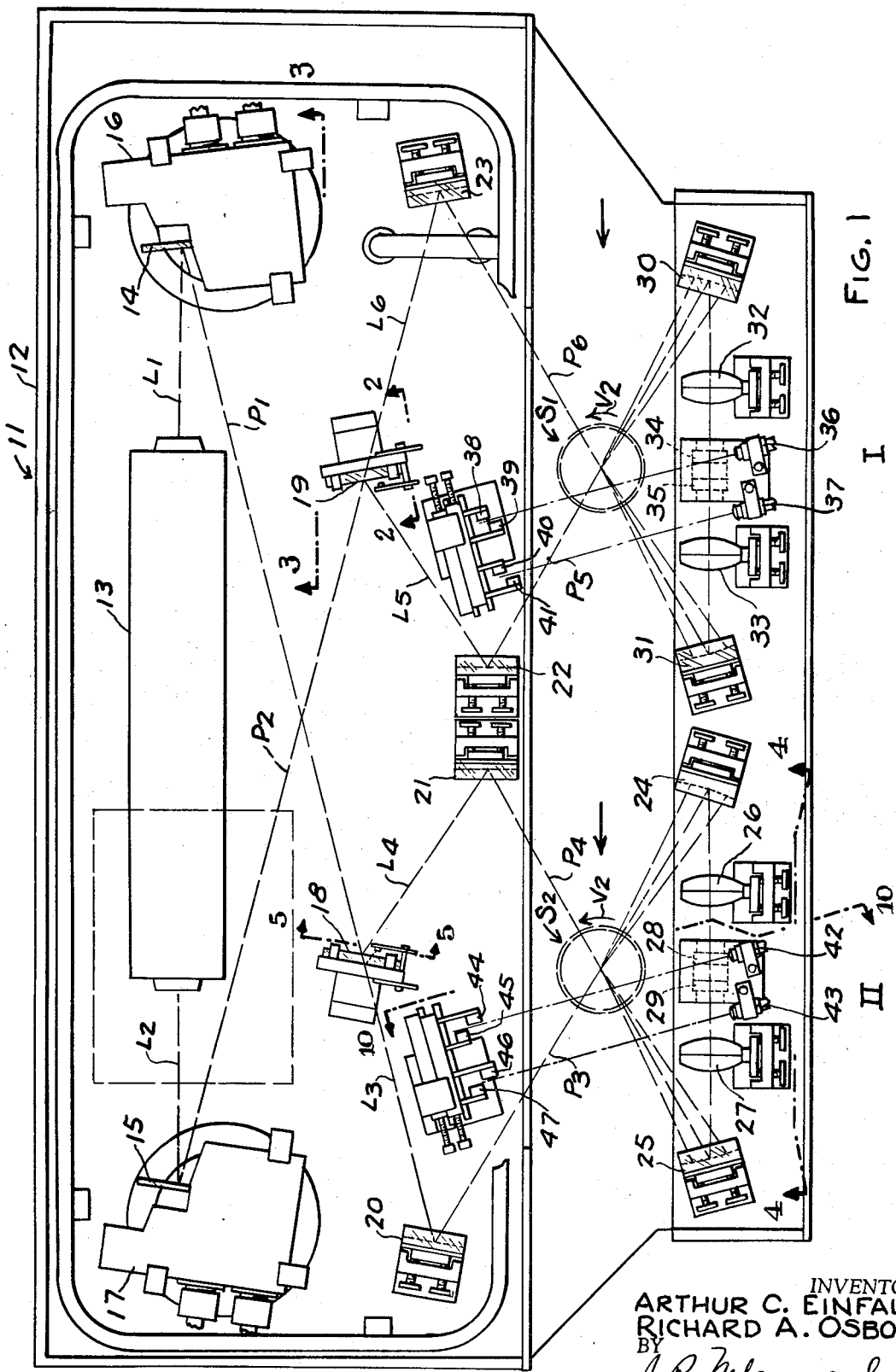
FIG. 1 is a plan view of an apparatus embodying the invention, parts being broken away.

Referring to FIGS. 1 and 2, the inspection apparatus generally shown at 11 is adapted to be used in connection with a line for making glass containers. Each container C is generally bulbous in shape including a neck portion N, a generally cylindrical center body portion D, and made of generally uniformly thick glass. Each container is suspended in an inverted position by a support 10 for passage through the apparatus in the direction of the arrows. As each container is moved through the inspecting apparatus, it is simultaneously rotated about its own vertical axis in the direction of arrows V2 shown in FIG. 1.

The apparatus shown in FIG. 1 has two inspection stations shown generally at I and II. Laser beams L5, L6 extend across station I and are interrupted by containers traveling through station I. The intensity of each beam is monitored after passing through the container. Defects in the container are detected by variations in beam intensity. Because of the relationships which must be maintained between the scanning rate of the beams and the translational and rotational velocities of the container for detecting a given size defect, beams L5 and L6 are incapable of scanning the complete 360 degree revolution of the container. Therefore, Station II is provided with laser beams L3, L4 to scan those portions of the container which were not scanned at station I.

The apparatus includes a housing 12 in which various components are supported including a laser source 13 that is adapted to direct laser beams L1, L2 out of each end thereof against mirrors 14, 15 of galvanometer devices 16, 17. Each galvanometer device 16, 17 is adapted to oscillate its mirror 14, 15, respectively, about a horizontal axis such as to reflect the beam L1, L2 in a vertical plane P1, P2 in a pattern having successive beam portions emanating radially from a source at angles established by the deflection of the mirror. The oscillating beams L1, L2 are then directed respectively through beam splitters 18, 19 that split the beams into beam portions L3, L4 and L5, L6, respectively. The beam portions L3, L4 are directed against parabolic mirrors 20, 21 that reflect successive incident beams as successive parallel beams lying in vertical planes $P_3$, $P_4$, which intersect at the center of station II. Similarly, beam portions L5, L6 are directed against parabolic mirrors 22, 23 and reflected as successive parallel beams lying in intersecting planes $P_5$, $P_6$ at station I.

The beam portions L3, L4 are reflected by spherical mirrors 24, 25 through collecting lenses 26, 27 to detectors 28, 29 that measure the intensity of the beams. Similarly, the beam portions L5, L6 are reflected by spherical mirrors 30, 31 through collecting lenses 32, 33 to detectors 34, 35.

POSITION SENSING

Figure 9:
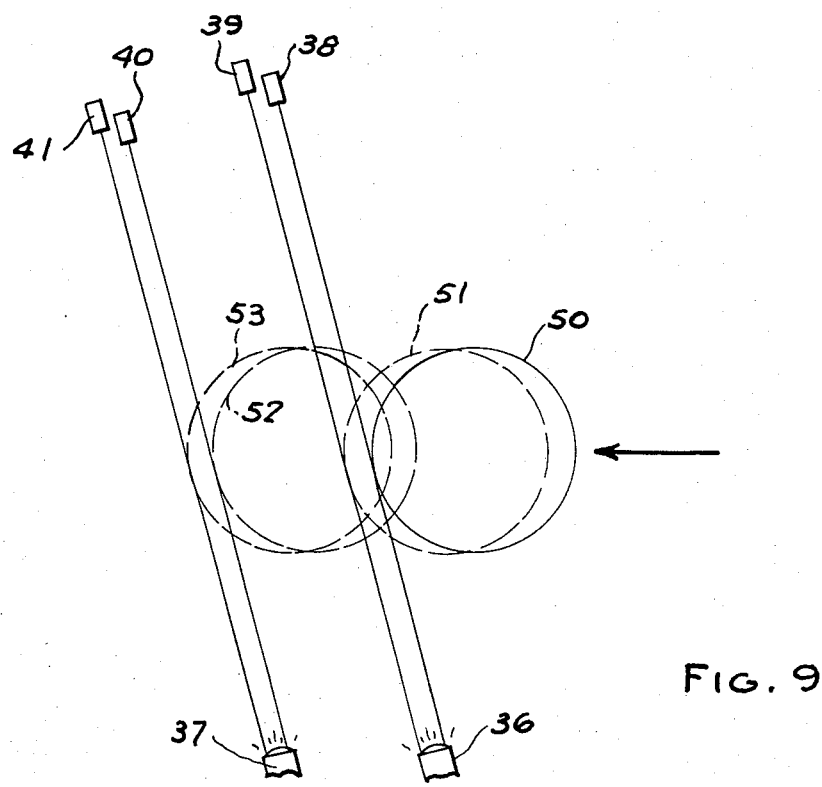
FIG. 9 is a diagram of a portion of the apparatus shown in FIG. 3.
Figure 10:
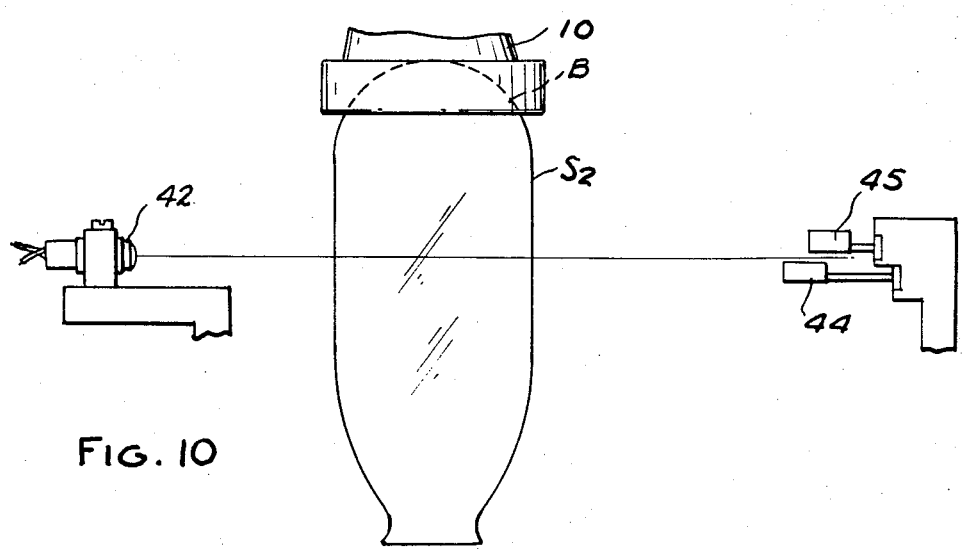
FIG. 10 is a fragmentary sectional view taken along the line 10—10 in FIG. 1.

Means are provided for sensing the position of each container as it passes through an inspection station. At station I, collimated light is directed from sources 36, 37 across the path of the containers to container position sensors 38, 39, 40 and 41. As a container passes through the station, the light to each sensor is successively interrupted thereby generating position signals (FIG. 9). Similarly, light sources 42, 43 and sensors 44, 45, 46, 47 comprise the container position sensing means at station II.

The capacity of the present invention to detect defects in a container is dependent upon the ability to monitor variations in the intensity of laser beam after passing through the container. In the inspection process, there are four factors which reduce the laser beam intensity as it passes through the container:

1. The thickness of the container;
2. The color of the container;
3. The angle of incidence relative to the surface of the container; and
4. The presence of defects within the container.

Since the containers will be of generally uniform thickness, all variations in thickness will result in only small variations in the monitored laser beam intensity. Also, since different colors of containers will not be mixed in the inspection apparatus, there will be no variation in monitored beam intensity because of container color.

As a container passes through an inspection station, the laser beam intersects the leading and trailing portions of the container at a relatively large angle of incidence. This causes a substantial reduction in the intensity of the monitored laser beam. Similarly, when the laser beam passes through a defect in the container, a large reduction in intensity of the monitored laser beam results. Simply detecting the reduced laser beam intensity will not reveal whether this variation has been caused by the beam passing through the container at a large incidence angle relative to the container surface or by the beam passing through a defect in the container. This problem is solved by the use of the above-mentioned container position sensors which prevent the detection of defects in the leading and trailing portions of the container.

Figure 11:
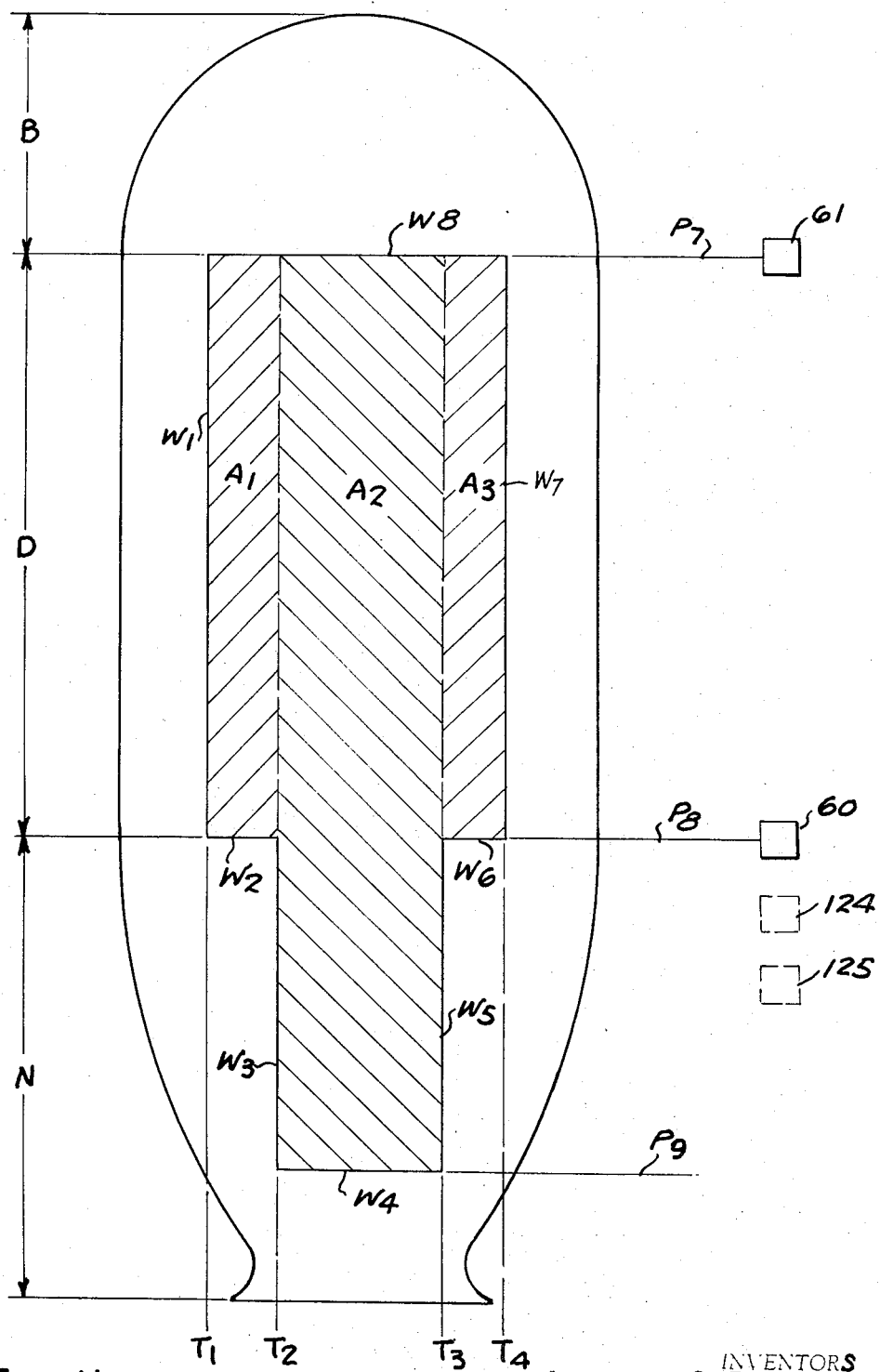
FIG. 11 is a diagram showing the scan window logic circuit of a container being inspected.

The container position sensors are so oriented relative to the travel of the container that signals from the position sensor in conjunction with the vertical sweep of the laser beam define a "scan window". The scan window allows defects to be detected only when the beam is looking through the scan window. FIG. 11 shows a scan window defined by lines W1 through W8.

FIG. 11 is a view looking from mirror 31 through a container C at station I toward mirror 23. While the operation of the inspection apparatus requires the container to travel through plane P6 of the light rays L6, it will be appreciated that the effect is the same as if the plane were moved relative to a stationary container. Therefore, FIG. 11 is now described with reference to plane P6 moving through a stationary container.

The galvanometer mirror deflection has been adjusted such that beam L6 oscillates in plane P6 between planes P7 and P9, which are parallel to each other and which are perpendicular to plane P6. As plane P6 travels uniformly from left to right in FIG. 9, beam L6 rapidly oscillates in plane P6. As plane P6 intersects the left-hand portion of the container, it does so at a relatively large angle of incidence relative to the container surface, and it is therefore impossible to monitor defects in this portion of the container. As plane P6 continues through the container, it will align with line W1 of the scan window at a time T1. The time T1 corresponds to that time in the actual operation of the apparatus when the leading edge of the container generates a signal in sensor 38. The position of the container at this time is shown by numeral 50 in FIG. 9.

As plane P6 continues through the container, container defects within the portion A1 of the scan window will be detected.

The alignment of plane P6 with line W3 of the scan window at a time T2 corresponds to the time when the leading edge of the container generates a signal in position sensor 39. The position of the container at time T2 is shown by numeral 51 in FIG. 9. Container defects lying within the A2 portion of the scan window will now be detected.

Similarly, the alignment of plane P6 with line W5 of the scan window at a time T3 corresponds to the container position designated by numeral 52 in FIG. 9. Container defects lying within area A3 of the scan window will now be detected.

Finally, the alignment of plane P6 with line T4 of the scan window corresponds to the container position designated by numeral 53 in FIG. 9.

Container position sensors 38, 39, 40, 41 generate scan windows for both beams L5, L6 while sensors 44, 45, 46, 47 generate the scan windows for beams L3, L4.

The vertical dimensions of the scan window are defined by planes P7, P8, P9 which function to determine lines W2, W4, W6, and W8. As previously mentioned, the planes P7 and P9 are established by the deflection of the galvanometer. Plane P8 is defined by a beam position sensor 60. Plane P8 is interposed between planes P7 and P9 and parallel to them for the purpose of reducing the width of the scan window in the neck portion of the container. Associated with plane P7 is a second beam position sensor 61. The signals from sensors 60, 61 are used to define the vertical position of the laser beam, as well be later discussed.

Figure 6:
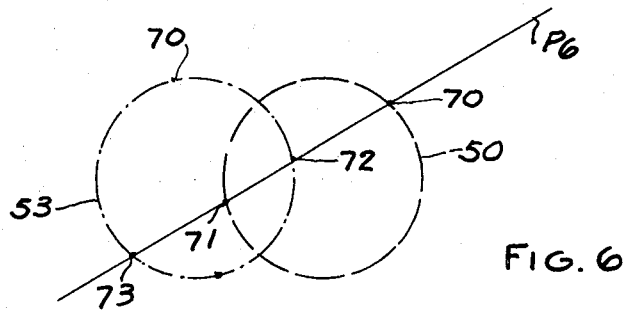
FIGS. 6, 7 and 8 are diagrams showing the manner in which the various portions of the container are inspected as it is moved through the inspection station.

Although FIG. 11 has been described with reference to a moving plane passing through a stationary container, the actual operation of the apparatus is such that the container is rotated about its axis as it is moved through a stationary plane containing the oscillating laser beam. FIG. 6 shows the position 50 of the container at time T1 and the position 53 of the container at time T4. With the container at position 50, plane P6 intersects the container at locations 70, 71. Because of the combined effect of its translational and rotational velocities, the container is moving in the direction of arrow faster than it is at location 71. With the container at position 53, plane P6 intersects the container at time T4 at locations 72, 73. Locations 70, 71 are shown with the container in position 53.

Figure 7:
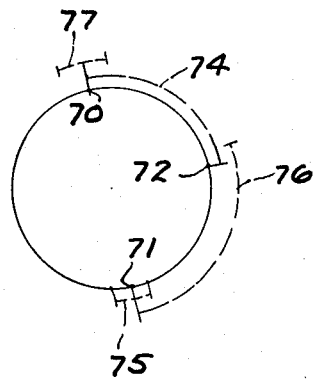

FIG. 7 shows the container position at time T4. The portions of the container indicated by broken lines 74, 75 have been scanned by beam L6 during the passage of the container through station I. As is apparent from FIG. 7, the arc length indicated by broken line 74 is greater than that indicated by broken line 75. This effect is caused by the superposition of the rotational velocity of the container upon the translational velocity of the container. Those portions of the container scanned by beam L5 are also indicated in FIG. 7 by broken lines 76 and 77.

The percentage of scan coverage is a function of the translational velocity of the container, rotational velocity of the container, and the angle of the laser beam relative to the direction of translation of the container. The coverage pattern shown in FIG. 7 is a typical example. Since the coverage is not complete, it is necessary to have a second inspecting station for completing the coverage. Station II is located in relation to station I for given container velocities such that the portions of the container not scanned at station I are scanned at station II.

Figure 8:
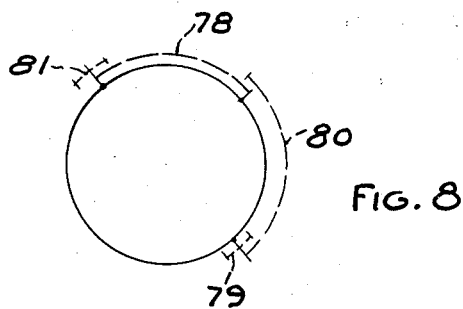

Similarly, FIG. 8 shows the neck portion N of the container at times T2 and T3. The portions of the neck which are scanned at station I by beam L6 are indicated by broken lines 78, 79, while the portions scanned by beam L5 are indicated by broken lines 80, 81.

SENSING AND DETECTING LOGIC

Figure 12:
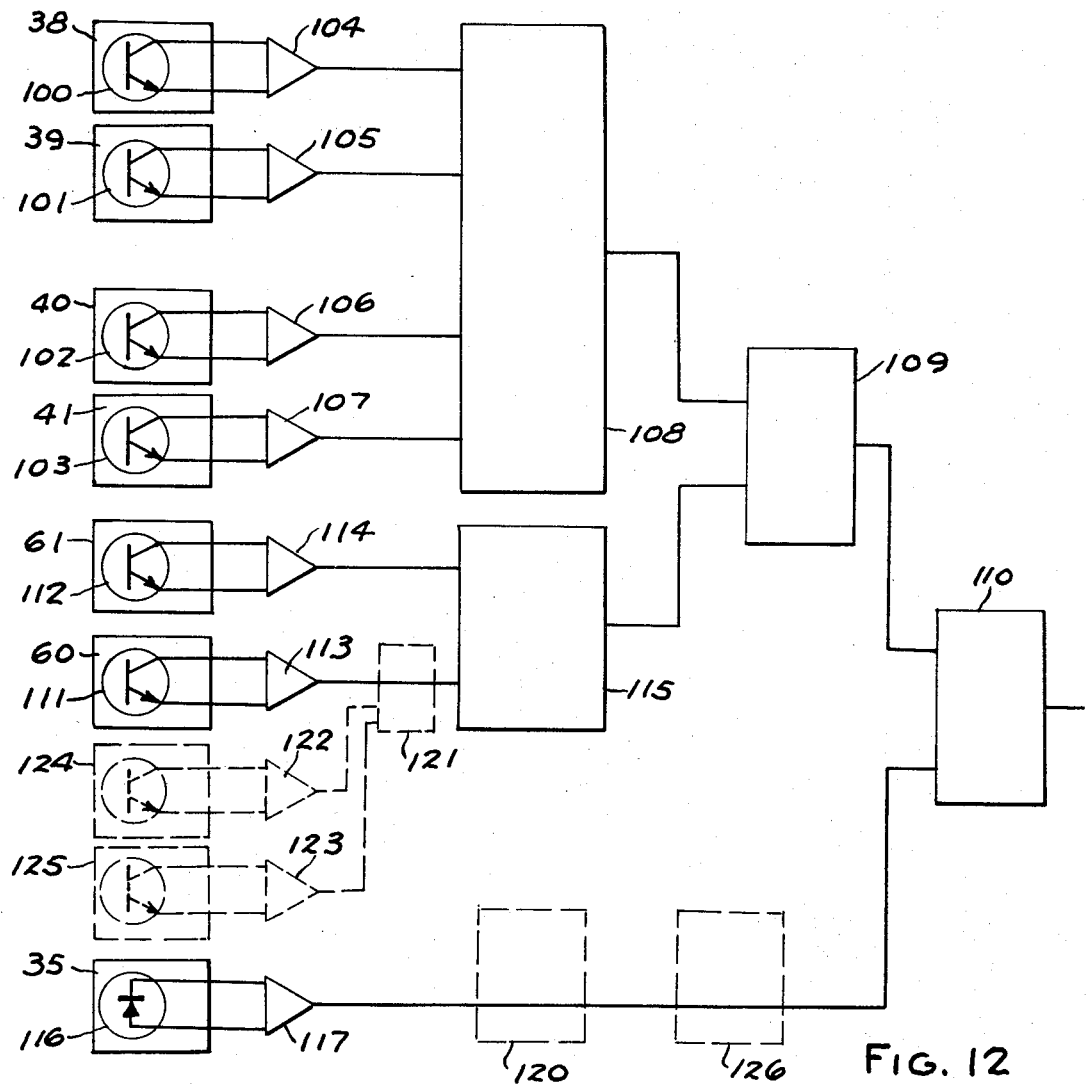
FIG. 12 is a schematic diagram of the circuit utilized in connection with the apparatus.

FIG. 12 shows the sensing and detecting logic used in connection with beam L6 at station I. Each container position sensor 38, 39, 40, 41 comprises a sensing element 100, 101, 102, 103, such as a photo transistor. Associated with each position sensor is an amplifier 104, 105, 106, 107 for amplifying signals from the sensor elements. These amplified signals are supplied as inputs to the container position logic 108. The output of the model position logic is supplied as an input to the scan window logic 109. The output of the scan window logic is supplied as an input to the reject logic 110.

Each beam position sensor 60, 61 comprises a sensing element 111, 112, such as a photo transistor. Associated with each position sensor is an amplifier 113, 114 for amplifying signals from the sensing element. These amplified signals are input to the beam position logic 115. The output of the beam position logic is supplied as an input to the scan window logic 109.

Defect detector 35 comprises a detecting element 116, such as a Schottky diode. Associated with the defect detector is an amplifier 117 which amplifies signals from the defect detector. The amplified output is supplied as an input to the reject logic 110.

Container position logic 108 comprises logic elements such as AND gates, OR gates and flip flops suitably interconnected such that the position of a container in the inspection station is always known with respect to plane P6. Beam position logic 115 also comprises suitably interconnected logic elements such that the position of beam L6 within plane P6 is always known in relation to the center and neck portions of the container.

Scan window logic 109 comprises logic elements suitably interconnected to determine when the beam L6 is looking through the scan window. The reject logic 110 also comprises logic elements suitably interconnected such that whenever beam L6 is within the scan window and a defect is detected, a reject signal is generated.

Figure 13:
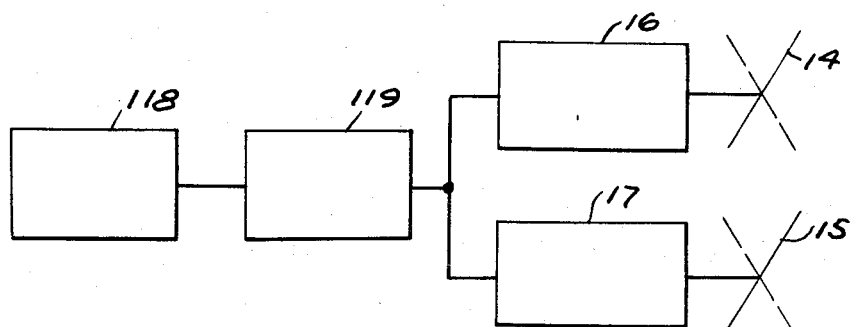
FIG. 13 is a schematic diagram of a further portion of the circuit.

FIG. 13 is a block diagram of the control circuit for galvanometer devices 16 and 17. The frequency of a variable frequency oscillator 118 is established by an input corresponding to the desired scan frequency of the laser beams. The oscillator in turn drives an integrating amplifier 119 which in turn drives galvanometers 16, 17 to which mirrors 14, 15 are respectively attached.

As heretofore set forth, the inspecting apparatus is particularly adapted for use in connection with a line for making glass containers. As is apparent from the above description of the apparatus, since two inspecting stations are provided, it is essential that the containers move on fixed container distances of a prescribed path from one engaging station to the next and must be rotated at a predetermined speed in order that at least half of the circumference will be inspected at the one station and the other half of the circumference will be inspected at the other station.

Figure 14:
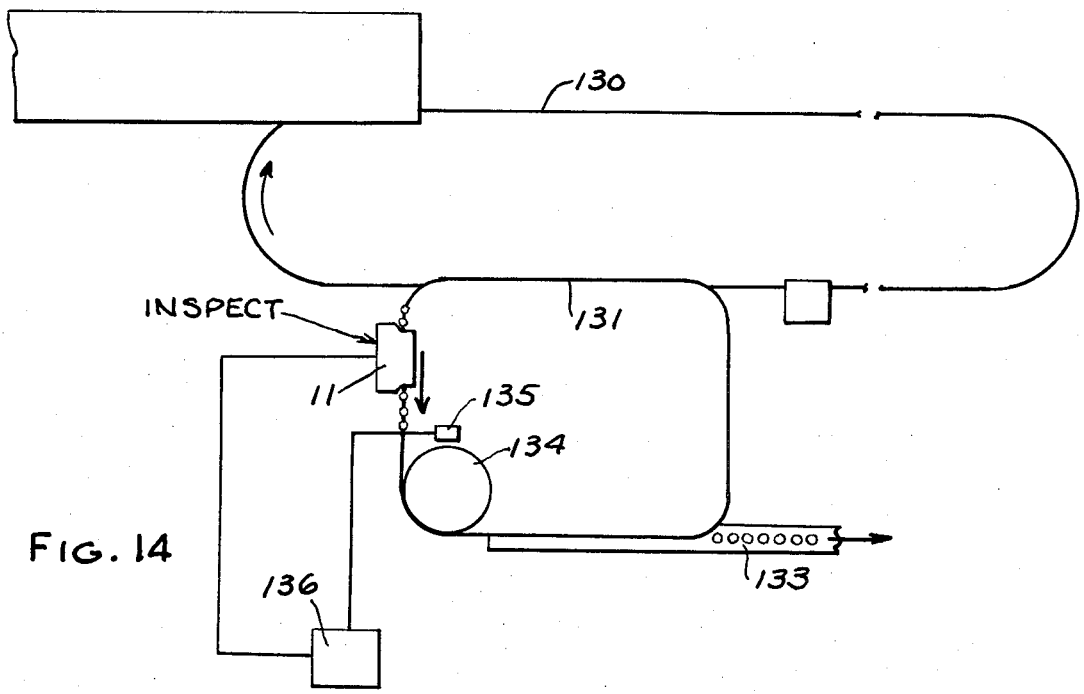
FIG. 14 is a schematic plan view of a portion of a glass-making apparatus embodying the invention.
Figure 15:
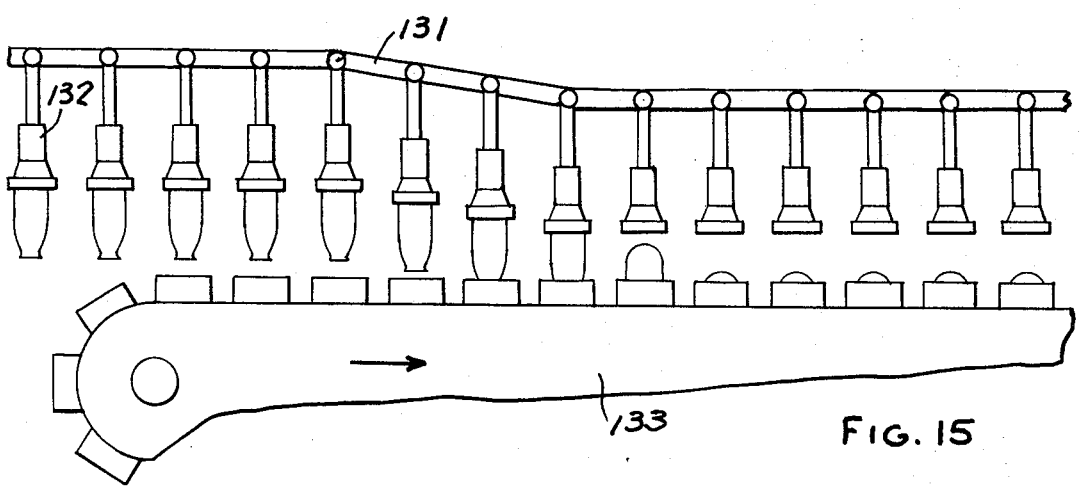
FIG. 15 is a fragmentary schematic elevational view of a portion of the apparatus shown in FIG. 14.

A portion of a glass forming line in which the inspection apparatus may be used is shown in FIGS. 14 and 15 wherein formed containers are carried by a line on conveyor 130 into position where they are picked up by an endless conveyor 131 (FIG. 15) that has a plurality of vacuum chucks 132 thereon. The vacuum chucks function to carry the containers and rotate the containers as they are moved throughout the inspecting apparatus 11. The conveyor 131 then transfers the containers to a conveyor 133. A sprocket or sensing wheel 134 is provided and rotates upon movement of the conveyor 131. A sensor 135 provides the timing signal to indicate the speed of the conveyor so that speed can be controlled by a speed control 136.

A typical apparatus in which the invention may be used is shown in the patent application of Frederick L. Wallington, Ser. No. 44,313, filed June 8, 1970, and entitled "Article Inspection and Rejection System".

OPERATION

The operation of the glass inspecting apparatus is described for the passage of a glass container through one inspection beam at one inspection station, for example, the passage of a container through beam L6 at station I as shown in FIG. 1. The description of the inspection technique also applies to beams L3, L4 and L5.

The gain of integrating amplifier 119 is established such that beam L6 is caused to oscillate between planes P7 and P9 as shown in FIG. 11. The frequency of oscillator 118 is adjusted such that the beam L6 is caused to oscillate at the desired scan frequency.

As the container enters the inspection station, the container interrupts beam L6 and because of the large angle of incidence of the beam relative to the surface of the container, the intensity of the beam is drastically reduced. Detector 35 senses this reduction in the beam intensity and generates a signal to the reject logic 110. The reject logic, however, cannot generate a reject signal because it has received no signal from the scan window logic 109 to enable it to convert the defect signal to a reject signal.

As the container continues through the station, its leading edge interrupts the light beam to container position sensor 38. The signal generated at sensor 38 changes the status of the container position logic 108. The container position logic now allows defect detection to take place in the center portion D of the container.

As beam L6 oscillates between planes P7 and P9, a small portion of the beam sweeps past beam position sensors 60, 61. Since only a small portion of the beam is blocked as it passes by sensors 60, 61, no erroneous defect signals are generated in the defect detector. The signals from the beam position sensors 60, 61 are applied to the beam position logic 115. The beam position logic establishes whether the beam is in the center portion or neck portion of the container. Thus, whenever beam L6 is between planes P7 and P8, defects will be detected.

As the container continues through the inspection station, the leading edge next interrupts the light beam to container position sensor 39. The signal generated by sensor 39 changes the status of the container position logic 108 such that defects may be detected in both center and neck portions of the container lying between planes P7 and P9.

The container next interrupts the light sensor 40. The signal from sensor 40 again changes the status of the container position logic 108 such that defects are detected only between planes P7 and P8.

Finally, the container interrupts the light to sensor 41 which generates a signal to change the status of the container position logic 108. The container position logic now prevents defect detection as the container exits from the inspection station.

If a reject signal has been generated at either station I or II during the inspection of a particular container, that container will be removed from the line after leaving the inspection apparatus by means responsive to the reject signal.

While the scanning and detection of beam L6 were described with reference to FIG. 12, it is not necessary that all the elements shown in FIG. 12 be duplicated for the scanning and detection of the other beams L3, L4, L5.

Because galvanometer devices 16, 17 are identical and are driven by the same integrating amplifier 119, mirrors 14 and 15 will maintain identical angular relationships relative to the horizontal. Therefore, beams L3, L4, L5 and L6 will always be coplanar as they scan. As a result, the inspection apparatus requires only one set of beam position sensors and beam position logic.

Each inspection station is so arranged that the laser beams intersect the axis of the container when the container is midway through the inspection station. Also, the beams pass through the container at equal angles relative to the direction of container travel. Because of this arrangement, only one set of container position sensors and container position logic is required for each station. Furthermore, only one set of scan window logic is required for each station.

Since one defect detector is required for each laser beam, a set of reject logic is required for each laser beam also.

The apparatus thus far described is capable of inspecting containers of a uniform size and uniform color glass. With the addition of certain minor refinements to the basic apparatus, it becomes readily adaptable for use with different size containers and containers of different color. This does not mean that different containers may be mixed on the same inspection line. Rather, it means that after a batch of identical containers have been inspected, the apparatus may be readily adapted to inspect a second batch of identical containers which are different from the first batch. For example, after inspecting a batch of 12-ounce, amber-color containers, the apparatus may be readily adapted to inspect 16-ounce green-color containers by changing the settings of selector switches.

The bottle color logic is represented by element 120 shown in phantom in FIG. 12. The bottle color logic 120 is inserted between amplifier 117 and reject logic 110. The bottle color logic operates as follows.

The output of the bottle color logic is adjusted for the color of bottle glass having the poorest light transmitting characteristics, the same output level is maintained by inserting attenuating resistors calibrated for each color of glass between the input and output of the bottle color logic. These resistors are inserted by switching means. Thus, regardless of bottle color, for a given intensity of laser beam passing through the container, a constant output level from the bottle color logic may be obtained.

Containers having similar widths but which differ in the length of the base and neck portions are readily accommodated by incorporation of additional beam position sensors and switching means. These are shown in phantom in FIG. 12 as switching means 121, amplifiers 122, 123 and beam position sensors 124, 125. The arrangement shown in FIG. 12 including the two additional beam position sensors can accommodate three different sizes of containers. The new beam position sensors are spaced from beam position sensors 60, 61 and are similarly located relative to the beam so as not to interfere with the defect detectors.

The upper position sensor 61 is unaffected by the different bottle sizes. The base B of the container C is always maintained in the same position relative to plane P7 and sensor 61. However, the location of plane P8 depends upon the size of the container and which of the three lower position sensors 60, 124, 125 is used as an input to beam position logic 115. The particular lower position sensor which will be used as an input to beam position logic 115 is established by switch 121.

The location of plane P9 will also change for different size containers. Since its position is determined by the lower limit of beam oscillation, the gain and bias of integrating amplifier 119 must be readjusted for the different size containers. This adjustment may be accomplished by means of calibrated resistors which are selectively inserted by switching means.

An additional feature which may be incorporated in the apparatus is a defect size sensitivity adjustment 126 which is inserted in phantom in FIG. 12 between the defect detector 35 and the reject logic 110. As was previously described, the inspection apparatus has the ability to detect defects which are at least of a certain minimum size. A particular inspection scheme may not characterize the aforesaid minimum defect size as a significant defect in the container. The defect size sensitivity adjustment 126 permits a variation in the minimum size defects which will be detected for purposes of rejecting the container. The minimum defect size for purposes of rejection is established by adjusting a threshold level within the defect size sensitivity adjustment 126. The magnitude of incoming defect signals is compared to this threshold level and if the threshold is exceeded, a defect signal is transmitted to reject logic 110.

We claim:

1. The method of inspecting hollow containers which are transparent to a laser beam for defects which comprises moving the containers successively and continuously past an inspection station with the axes of successive containers parallel to one another, directing a laser beam toward the inspection station at an angle such that the beam will intersect each container as it passes through the station, rotating the container as it passes through the station, causing the laser beam to move in a plane such that successive positions of the beam are parallel to one another and at an angle to the axes of the containers to thereby scan successive portions of the container as it is moved and rotated through the inspection station, and creating a signal when the intensity of the beam transmitted entirely through the container is diminished by a defect below a predetermined value.

2. The method set forth in claim 1 including the step of sensing which portion of the container is being inspected, and creating a reject signal only when the beam is being directed at a predetermined portion of the container such that adverse deflection of the beam due to the shape of the container does not create a diminution in the intensity of the beam which would cause a false signal.

3. The method set forth in claim 2 wherein said last-mentioned step is performed by sensing the position of the beam and the container with respect to the inspection station.

4. The method set forth in claim 1 including the step of directing a second laser beam toward the container as it passes through the inspection station at an angle to the first mentioned beam, and moving said second beam in a plane such that successive positions of the beam are parallel to one another and at an angle to the axes of the containers, said step of creating a signal being in response to diminution of the intensity by a defect of either of the laser beams transmitted entirely through the container.

5. The method set forth in claim 4 wherein said second beam is achieved by splitting the first mentioned laser beam.

6. The method of inspecting hollow containers which are transparent to a laser beam for defects which comprises moving the containers successively and continuously past two successive inspection stations with the axes of the successive containers parallel to one another, directing a laser beam toward each inspecting station at an angle such that the beam will intersect each container as it passes through the station, rotating the container as it passes through each station, moving the laser beam at each station in a plane such that successive positions of the beam are parallel to one another and at an angle to the axes of the containers to thereby scan overlapping portions of the container as it is moved and rotated through the inspection stations, and creating a signal when the intensity of the beam transmitted entirely through the container at any station is diminished by a defect below a predetermined value.

7. The method set forth in claim 6 including the step of sensing which portion of the container is being inspected, and creating a signal only when the beam is being directed at a predetermined portion of the container such that adverse deflection of the beam due to the shape of the container does not create a diminution in the intensity of the beam which would cause a false signal.

8. The method set forth in claim 7 wherein said last-mentioned step is performed by sensing the position of the beam and the container with respect to the inspection station.

9. The method set forth in claim 1 including the step of directing a second laser beam toward the container at said station as it passes through the inspection station at an angle to the first mentioned beam, and moving said second beam in a plane such that successive positions of the beam are parallel to one another and at an angle to the axes of the containers, said step of creating a signal being in response to diminution of the intensity by a defect of either of the laser beams transmitted entirely through the container.

10. The method set forth in claim 9 wherein said second beam is achieved by splitting the first mentioned beam.

11. The method of inspecting hollow containers which are transparent to a laser beam for defects which comprises directing a laser beam toward an inspecting station at an angle such that the beam will intersect a container at the station, rotating the container at the station, causing the laser beam to move in a plane such that successive positions of the beam are parallel to one another and at an angle to the axis of the container to thereby scan successive portions of the container at the inspection station, and creating a signal when the intensity of the beam transmitted entirely through the container is diminished by a defect below a predetermined value.

12. An apparatus for inspecting hollow containers which are transparent to a laser beam for defects which comprises means for moving the containers successively and continuously through an inspection station, a laser source, means for directing a beam from said laser source toward the inspecting station at an angle such that it will intersect the container as it moves through the inspection station, said means causing said beam to move in a plane such that successive positions of the beam are parallel to one another and at an angle to the axis of the container, means for sensing the intensity of the beam transmitted through the container, and means for creating a signal when the intensity of the beam is diminished by a defect below a predetermined value.

13. The combination set forth in claim 12 including means for creating said signal only when the container is present at the inspection station.

14. The combination set forth in claim 13 including means for sensing the portion of the container which is being inspected, and means for creating said signal only when a predetermined portion of said container is being inspected.

15. The combination set forth in claim 14 wherein said sensing means is responsive to the position of the beam with respect to the container as it is moved in said plane.

16. The combination set forth in claim 14 including means for sensing the position of the container.

17. The combination set forth in claim 13 including means for directing a second beam against said container as it passes through the inspection station, means for moving said second beam in a plane such that successive portions of the beam are parallel to one another, said means for creating a signal being responsive to a diminution in intensity by a defect of either of said beams transmitted entirely through the container.

18. An apparatus for inspecting containers which are transparent to a laser beam for defects which comprises means for moving the containers successively and continuously through a pair of inspection stations, a laser source at each station, means for directing a beam from said laser source toward the inspecting station at an angle such that it will intersect the container as it moves through the inspection station, said means causing said beam to move in a plane such that successive positions of the beam are parallel to one another and at an angle to the axes of the containers, means for sensing the intensity of the beam transmitted through the container, and means for creating a signal when the intensity of the beam transmitted entirely through the container at any station is diminished by a defect below a predetermined value.

19. The combination set forth in claim 18 including means for creating said signal only when the container is present at an inspection station.

20. The combination set forth in claim 19 including means for sensing the portion of the container which is being inspected, and means for creating said signal only when a predetermined portion of said container is being inspected.

21. The combination set forth in claim 20 wherein said sensing means is responsive to the position of the beam with respect to the container as it is moved in said plane.

22. The combination set forth in claim 20 including means for sensing the position of the container.

23. The combination set fort in claim 18 including means for directing a second beam against said container as it passes through each inspection station, and means for moving said second beam in a plane such that successive portions of the beam are parallel to one another, said means for creating a signal being responsive to a diminution in intensity by a defect of any of said beams transmitted entirely through the container.

24. The method of inspecting hollow containers for defects which comprises moving the containers successively and continuously past an inspection station with the axes of successive containers parallel to one another, directing a collimated beam of radiant energy to which the container is transparent and of sufficient intensity that it will pass entirely through the container toward the inspecting station at an angle such that the beam will intersect each container as it passes through the station, rotating the container as it passes through the station, causing the collimated beam to move in a plane such that successive positions of the beam are parallel to one another and at an angle to the axes of the containers to thereby scan successive portions of the container as it is moved and rotated through the inspection station, and creating a signal when the intensity of the beam transmitted entirely through the container is diminished by a defect below a predetermined value.

25. The method set forth in claim 24 including the step of sensing which portion of the container is being inspected, and creating a signal only when the beam is being directed at a predetermined portion of the container such that adverse deflection of the beam due to the shape of the container does not create a diminution in the intensity of the beam which would cause a false signal.

26. The method set forth in claim 24 including the step of directing a second collimated beam of radiant energy to which the container is transparent and of sufficient intensity that it will pass entirely through the container toward the container as it passes through the inspection station at an angle to the first mentioned beam, and moving said second beam in a plane such that successive positions of the beam are parallel to one another and at an angle to the axes of the containers, said step of creating a signal being in response to diminution of the intensity by a defect of either of the collimated beams transmitted entirely through the container.

27. An apparatus for inspecting hollow containers for defects which comprises means for moving the containers successively and continuously through an inspection station, a collimated source of radiant energy to which the container is transparent and of sufficient intensity that it will pass entirely through the container, means for directing a beam from said collimated source toward the inspecting station at an angle such that it will intersect the container as it moves through the inspection station, said means causing said beam to move in a plane such that successive positions of the beam are parallel to one another and at an angle to the axes of the containers, means for sensing the intensity of the beam transmitted through the container, and means for creating a signal when the intensity of the beam transmitted entirely through the container is diminished by a defect below a predetermined value.

* * * * *

PO-1050
(5/69)

UNITED STATES PATENT OFFICE
CERTIFICATE OF CORRECTION

Patent No. 3,684,385     Dated August 15, 1972

Inventor(s) Arthur C. Einfalt; Richard A. Osborn

It is certified that error appears in the above-identified patent and that said Letters Patent are hereby corrected as shown below:

Column 4, line 17, after "line" insert
        --W7 at a time--

Signed and sealed this 20th day of March 1973.

(SEAL)
Attest:

EDWARD M. FLETCHER, JR.            ROBERT GOTTSCHALK
Attesting Officer                 Commissionr of Patents